United States Patent
Zhang et al.

(10) Patent No.: US 6,636,619 B1
(45) Date of Patent: Oct. 21, 2003

(54) COMPUTER BASED METHOD AND APPARATUS FOR OBJECT RECOGNITION

(76) Inventors: Zhongfei Zhang, 201 Evergreen St., Vestal, NY (US) 13850; Rohini K. Srihari, 276 Meadowview La., Williamsville, NY (US) 14221

( * ) Notice: Subject to any disclaimer, the term of this patent is extended or adjusted under 35 U.S.C. 154(b) by 0 days.

(21) Appl. No.: 09/476,720

(22) Filed: Dec. 30, 1999

Related U.S. Application Data (60) Provisional application No. 60/142,579, filed on Jul. 7, 1999.

(51) Int. Cl.⁷ ................................................. G06K 9/46
(52) U.S. Cl. ....................... 382/118; 382/164; 382/190; 382/224
(58) Field of Search ................................ 382/118, 190, 382/224, 225, 164, 173

(56) References Cited

U.S. PATENT DOCUMENTS

| | | | |
|---|---|---|---|
| 5,012,522 A | | 4/1991 | Lambert |
| 5,164,992 A | | 11/1992 | Turk et al. |
| 5,245,675 A | * | 9/1993 | Ferre et al. ............. 382/159 |
| 5,450,504 A | | 9/1995 | Calia |
| 5,561,718 A | | 10/1996 | Trew et al. |
| 5,642,431 A | | 6/1997 | Poggio et al. |
| 5,699,449 A | | 12/1997 | Javidi |
| 5,715,325 A | | 2/1998 | Bang et al. |
| 5,802,208 A | | 9/1998 | Podilchuk et al. |
| 6,178,261 B1 | * | 1/2001 | Williams et al. .......... 382/190 |

OTHER PUBLICATIONS

Al–Shaykh et al. "Invariant Image Analysis Based on Radon Transform and SVD." IEEE Trans. on Circuits and Systems—II.Analog and Digital Signal Processing, vol. 43, No. 2, Feb. 1996, pp. 123–133.*

Example–Based Learning for View–Based Human Face Detection. IEEE Transactions on Pattern Analysis and Machine Intelligence, vol. 20, No. 1, Jan. 1998, pp. 39–51.

Neural Network–Based Face Detection. IEEE Transactions on Pattern Analysis and Machine Intelligence, vol. 20, No. 1, Jan. 1998, pp. 23–38.

Human and Machine Recognition of Faces: A Survey. Proceedings of the IEEE, vol. 83, No. 5, May 1995, pp. 703–740.

Visionics Corporation, Innovations in Recognition Systems. http://www.faceit.com, Apr. 28, 1998.

Face Recognition From One Example View. Proc. of IEEE International Conference on Computer Vision, IEEE Computer Society Press, 1995, pp. 500–507.

A robust face identification scheme–KL expansion of an invariant feature space. SPIE vol. 1607 Intelligent Robots and Computer Vision X: Algorithms and Techniques, 1991, pp. 71–84.

Probabilistic Visual Learning for Object Representation. IEEE Transactions on Pattern Analysis and Machine Intelligence, vol. 19, No. 7, Jul. 1997, pp. 696–710.

Eigenfaces vs. Fisherfaces: Recognition Using Class Specific Linear Projection. IEEE Transactions on Pattern Analysis and Machine Intelligence, vol. 19, No. 7, Jul. 1997, pp. 711–720.

Face Recognition: The Problem of Compensating for Changes in illumination Direction. IEEE Transactions on Pattern Analysis and Machine Intelligence, vol. 19, No. 7, Jul. 1997, pp. 721–732.

(List continued on next page.)

*Primary Examiner*—Jon Chang
(74) *Attorney, Agent, or Firm*—Simpson & Simpson, PLLC (57) ABSTRACT

A computer-based method and apparatus for recognition of objects which uses a novel subspace morphing theory, thereby obviating the need for normalization of scales prior to identification.

23 Claims, 8 Drawing Sheets

OTHER PUBLICATIONS

Linear Object Classes and Image Synthesis From a Single Example Image. IEEE Transactions on Pattern Analysis and Machine Intelligence, vol. 19, No. 7, Jul. 1997, pp. 733–742.

An Algorithm for the Learning of Weights in Discrimination Functions Using a Priori Constraints. IEEE Transactions on Pattern Analysis and Machine Intelligence, vol. 19, No. 7, Jul. 1997, pp. 764–779.

Automatic Interpretation and Coding of Face Images Using Flexible Models. IEEE Transactions on Pattern Analysis and Machine Intelligence, vol. 19, No. 7, Jul. 1997, pp. 743–755.

Face Recognition: Features versus Templates. IEEE Transactions on Pattern Analysis and Machine Intelligence, vol. 15, No. 10, Oct. 1993, pp. 1042–1052.

Algebraic Feature Extraction of Image for Recognition. Pattern Recognition Journal, vol. 24, No. 3, pp. 211–219, 1991.

Mixtures of Local Linear Subspaces for Face Recognition. Proc. of International Conference on Computer Vision and Pattern Recognition, IEEE Computer Society Press, 1998, pp. 32–37.

How Should We Represent Faces for Automatic Recognition? IEEE Transactions on Pattern Analysis and Machine Intelligence, vol. 21, No. 8, Aug. 1999, pp. 725–736.

Line–Based Face Recognition under Varying Pose. IEEE Transactions on Pattern Analysis and Machine Intelligence, vol. 21, No. 10, Oct. 1999, pp. 1081–1088.

Recognizing Human Faces in Complex Context. International Conference on Imaging Science Systems and Technology, CSREA Press, Las Vegas, Nevada, Jul. 1998, pp. 218–225.

Identifying Human Facez in General Appearances. IEEE International Conference on Systems, Man and Cybernetics, IEEE Press, San Diego, California, Oct. 1998, pp. 4318–4323.

* cited by examiner

SVD Distance = 41.61

SVD distance = 5.88

SVD distance = 8.83

SVD distance = 7.63

COMPUTER BASED METHOD AND APPARATUS FOR OBJECT RECOGNITION

PRIORITY CLAIM

This non-provisional patent claims the benefit under 35 U.S.C. Section 119(e) of U.S. Provisional Patent Application No. 60/142,579, filed on Jul. 7, 1999.

SOURCE CODE LISTING

This patent includes a Computer Program Listing Appendix comprising the source code as found in the accompanying compact disc. The source code comprises the following files:

| File Name | Date of Creation | File Size (in KB) |
|---|---|---|
| cccomp.h | Jul. 2, 1999 | 2 |
| complex.h | Jul. 2, 1999 | 1 |
| image_struct.h | Jul. 2, 1999 | 2 |
| nr.h | Jul. 2, 1999 | 32 |
| nrutil.h | Jul. 2, 1999 | 4 |
| tiff.h | Jul. 2, 1 999 | 13 |
| tiffio.h | Jul. 2, 1999 | 10 |
| main_linear.c | Nov. 28, 1998 | 4 |
| diff_linear.c | Nov. 28, 1998 | 7 |
| sv_tif_testj.c | Jan. 26, 1997 | 4 |
| glob_dat.c | Jul. 2, 1999 | 1 |
| mem.c | Jul. 2, 1999 | 2 |
| hue_mask.c | Jul. 2, 1999 | 2 |
| tiff2RGB.c | Jul. 2, 1999 | 3 |
| rgb2tiff.c | Jul. 2, 1999 | 3 |
| nrutil.c | Jul. 2, 1999 | 17 |
| svdcmp.c | Jul. 2, 1999 | 4 |
| pythag.c | Jul. 2, 1999 | 1 |

The source code as found in the computer program listing appendix and all the files therein, including the files listed above, is hereby incorporated by reference.

FIELD OF THE INVENTION

The present invention relates generally to object recognition, more specifically to computer based object recognition, and, more particularly, to a subspace morphing method for object recognition which obviates the need for normalization of images.

BACKGROUND OF THE INVENTION

Although many successful techniques have been proposed in certain specific applications, object recognition, in general, remains a difficult and challenging problem. In appearance based approaches, representation of only the appearance of the object is still not sufficient for object recognition. This is because the variation space of the appearance is so huge that it is impossible to enumerate all the possible appearances (and then to index them). Depending upon the type of object at issue, the variation space comprises different variation dimensions. Existing techniques for object recognition require that the feature selection and matching be done in a predefined, dimensionally fixed space, and, if images of objects are given in different dimensions, a normalization in scale technique has to be applied to allow the feature vectors to fit into this space. Unfortunately, these normalization-based techniques have several major drawbacks, including, but not limited to an increase in processing time and resources.

In general, there are two types of variation dimensions in the appearance variation space. The first type of variation dimensions is due to the nature of the object itself, and different types of objects may result in different dimensions of variation. This type of variation dimension is referred to as an internal variation factor. In the case of a human face, for example, internal variation factors include face expression, face pose, face orientation, etc. The second type of variation dimensions is due to the environment and conditions when the object image is taken, and has nothing to do with the specific object represented by the image. This type of variation dimension is referred to as an external variation factor. Examples of external variation factors include scale (related to how close the camera is with respect to the object when the picture is taken), contrast (related to the lighting conditions when the picture is taken), and background (related to the environment where the picture is taken). External variation factors are independent of the object types to be recognized.

What is needed, then, is an object recognition method that does not require normalization of images.

SUMMARY OF THE INVENTION

The present invention is a computer-based method and apparatus for recognition of objects. The invention uses a novel subspace morphing theory which obviates the need for normalization of scales prior to identification.

DETAILED DESCRIPTION OF THE PREFERRED EMBODIMENT

In the description, which follows, the term "recognition" is intended to comprise detection and identification. The acronym SVD Distance as used in the following description is defined to mean the distance between two morphed SV (singular value) vectors.

Figure 1:
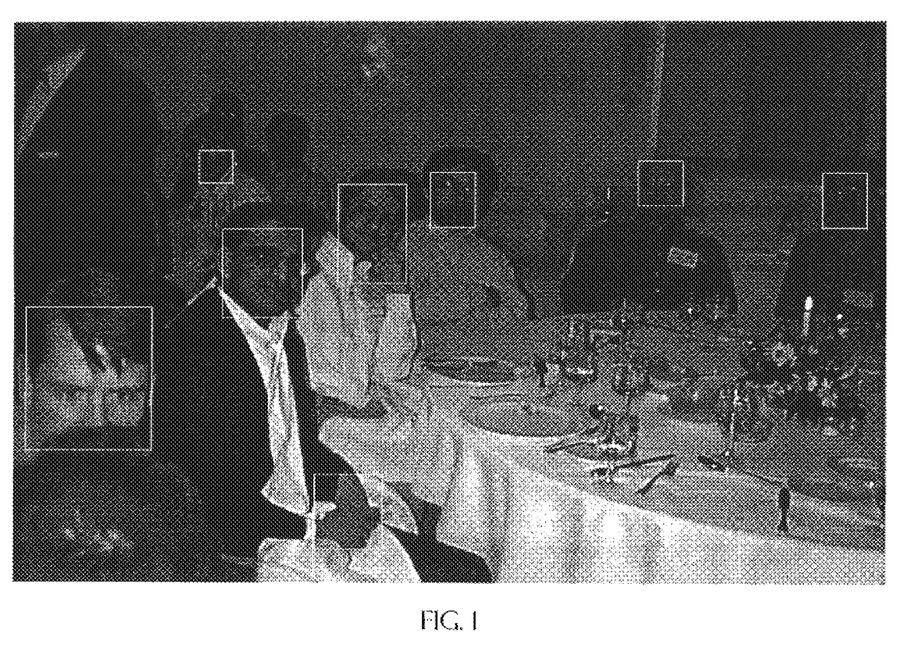
FIG. 1 is a first image containing a plurality of face images, with each of the face images having different scales, orientations, poses and expressions.
Figure 2:
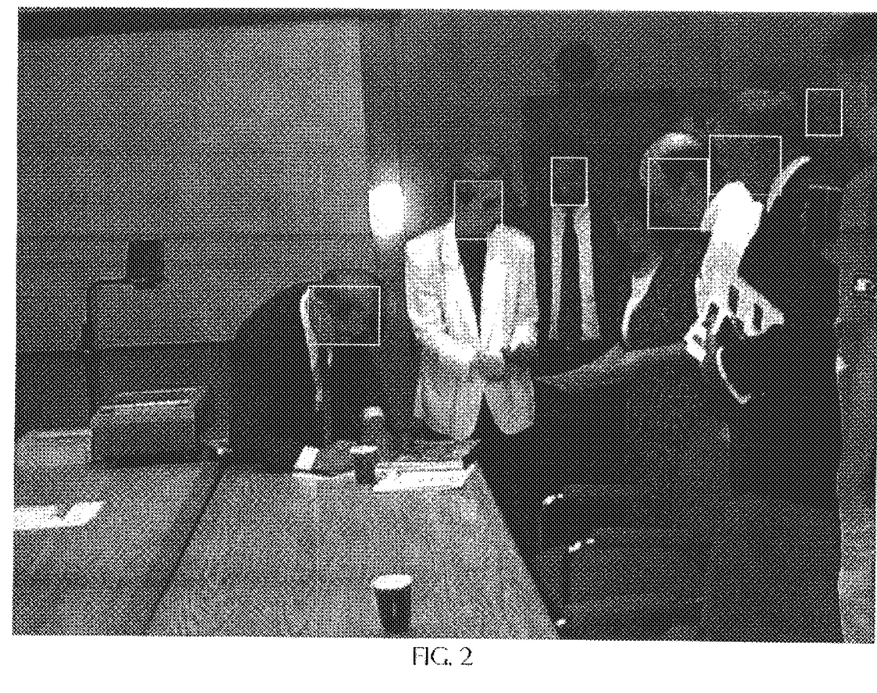
FIG. 2 is a second image containing a plurality of face images, with each of the face images having different scales, orientations, poses and expressions.
Figure 3:
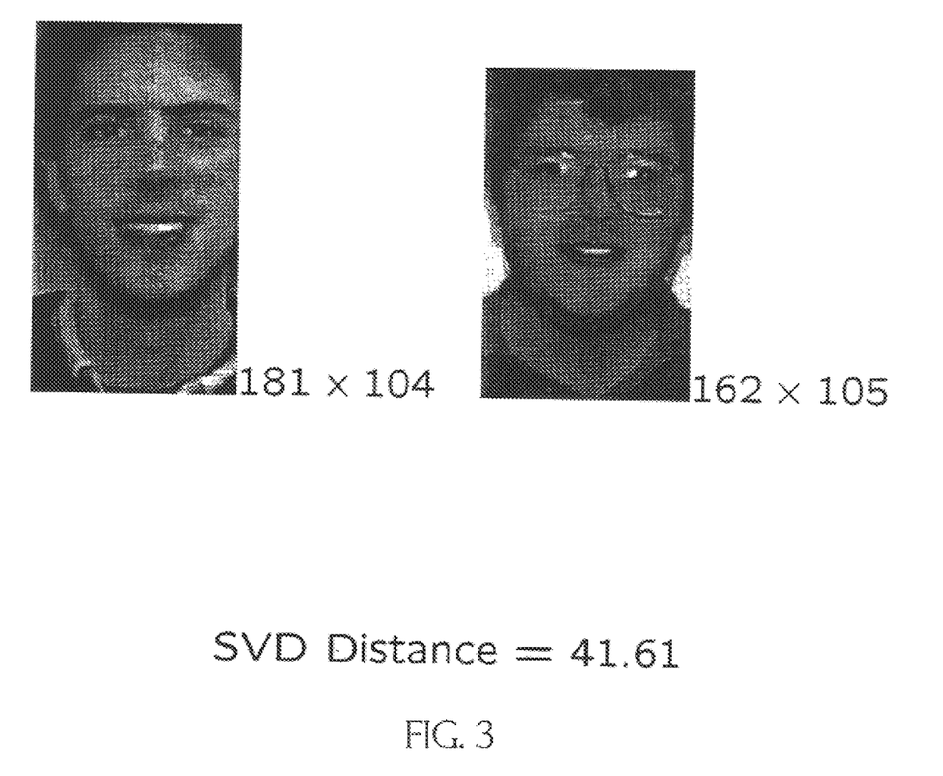
FIG. 3 illustrates the SVD Distance of a pair of SV morphed vectors for face images of two different individuals.

The theory developed in this patent for appearance based object recognition is called subspace morphing theory. This work was motivated by the practical demand for a technique for recognizing objects collected with different scales and from different appearances. FIGS. 1 and 2 are first and second color images, respectively, each of which contains a plurality of face images, with each of the face images having different scales, orientations, poses and expressions. The images of FIGS. 1 and 2 illustrate typical "everyday life" situations. For example, FIG. 1 illustrates a group of individuals at a dinner meeting. Some individuals are seated, others are standing. Some individuals are facing the camera; others are turned at various angles with respect to the camera. Some faces are obscured or partially obscured. Similarly, FIG. 2 illustrates a group of participants at an academic seminar approaching the speaker at the conclusion of the talk. In this photographic image, only one person (third from left) is directly facing the camera. Some of the other people are facing to the left, others to the right, etc., and all face images vary in scale, appearance, pose and expression. The object of the present invention is to analyze images such as these, detect certain objects (such as faces), and then identify those objects (faces).

In the description that follows, theorems, definitions and equations are numbered for convenience.

Although the subspace morphing theory may be used for any type of object, throughout this patent, we use human face recognition as an example to demonstrate the application of this theory. In this patent, we always assume that the features we used are singular value (SV) vectors, and thus a feature space is a singular value space. Furthermore, we also assume that each SV vector has been sorted in value from the largest to the smallest. In the following description, we use R to denote a real space; thus, $R^n$ is an n dimensional vector space, and $R^{m \times n}$ is an m×n dimensional matrix space (or image space). Also, we use a boldface symbol to denote a vector or matrix.

Sizing Theorem of SVD

The foundation of the subspace morphing theory and its algorithm is based on the following theorem, which we call the sizing theorem of singular value decomposition (SVD) for two arbitrary matrices (i.e. images) $A_1$ and $A_2$:

Theorem 1 Let, $A_1 \epsilon R^{m_1 \times n_1}$, $A_2 \epsilon R^{m_2 \times n_1}$, W.L.O.G. $m_1 \geq n_1 m_2 \geq n_2$. By SVD ∃SV vectors Λ and Σ for $A_1$ and $A_2$, respectively.

Then, if $n_1 > n_2$, extend the dimensionality of the vector Σ to $n_1$ by padding 0's to the rest of its dimensions; else, extend the dimensionality of Λ to $n_2$ similarly. Thus, for any positive integer n, the following holds:

$$\|\sqrt{m_{2n_2}}\Lambda - \sqrt{m_{1n_1}}\Sigma\|_n \leq \|B_1 - B_2\|_F \quad (1)$$

where $B_1$ is the matrix obtained by row-scaling $m_2$ and column-scaling $n_2$ of $A_1$, $B_2$ is the matrix obtained by row-scaling $m_1$ and column-scaling $n_1$ of $A_2$, and $\|.\|_F$ stands for matrix Frobenius norm, and $\|.\|_n$ the norm of an n dimensional vector.

We omit the proof of this theorem, in favor of a conceptual explanation. Given two images with different dimensions, we can always map them into a common space of imagery. This theorem establishes a relationship between the SV vectors extracted in the current spaces of these two images and the SV vectors that would be extracted after mapping them into that common space. Thus, using this theorem, we can immediately "extract" the SV vectors from that hypothetical common space based on the SV vectors obtained from the current space without actually mapping them into that common space.

Subspace Morphing

Based on the sizing theorem, we develop the subspace morphing theory. We start with the concept of vector projection from a space to another space.

Definition 1 Let v be a vector in space $R^n$. Let $R^m$ be an arbitrary space. Define vector v' as a projection of v in space $R^n$ to space $R^m$ as follows. If m>n, the dimensionality of v' is extended by padding 0's to the rest of its dimensions; if m<n, the dimensionality of v' is truncated to m; if m=n, v'=v.

Now we can introduce the concept of morphing an SV vector from a space to another space.

Definition 2 Given two arbitrary spaces $R^{m \times n}$ and $R^{p \times q}$. W.L.O.G. assume $m \geq n$, $p \geq q$. Let $A \epsilon R^{m \times n}$ v be its SV vector, and u' be the projection of v in space $R^n$ to space $R^q$. Define vector v' as the morphed SV vector of v in space $R^n$ to space $R^q$ as follows:

$$v' = \frac{\sqrt{pq}}{\sqrt{mn}} u' = \sqrt{pq} u \quad (2)$$

where $$u = \frac{1}{\sqrt{mn}} u' \quad (3)$$

is called the essential SV vector of v.

This is to say that v' is the "equivalent" SV vector of a matrix in $R^{p \times q}$ mapped from A space $R^{m \times n}$. Note that the values of the elements in an essential SV vector will always stay the same regardless whatever space it is morphed to.

Now we are ready to define the algebraic operations between two SV vectors with different dimensionalities.

Definition 3 $A \epsilon R^{m_1 \times n_1}$, $B \epsilon R^{m_2 \times n_2}$, W.L.O.G. assume $m_1 \geq n_1, m_2 \geq n_2$. Let $v_A$ and $v_B$ be their SV vectors, respectively. Given any space $R^{p \times q}$, W.L.O.G. assume $p \geq q$. Define the addition of $v_A$ and $v_B$ in space $R^q$ as:

$$v = \sqrt{pq}\left(\frac{1}{\sqrt{m_1 n_1}} v'_A + \frac{1}{\sqrt{m_2 n_2}} v'_B\right) = \sqrt{pq(u_A + u_B)} \quad (4)$$

where $u_A$ and $u_B$ are the essential SV vectors of $v_A$ and $v_B$, and $v_A'$ and $v_B'$ are the projection vectors of $v_A$ and $v_B$, respectively.

In other words, $v_A$ and $v_B$ are first morphed to the space $R^{p \times q}$ before the addition is conducted.

Similarly, we can define the subtraction, dot product, and cross product of two SV vectors with different dimensionalities. Note that all these algebraic operations between two SV vectors are defined up to morphing them to a "common" space before the actual operation may be conducted, and this "common" space may be any arbitrary space; it does not necessarily have to be one of the original SV vector spaces or one of the essential SV vector spaces. As we will explain later, this gives us a great deal of flexibility in finding the best matching in the feature space.

Extending the binary operation between two SV vectors, we can define operations on a set of SV vectors with possibly different dimensionalities.

Definition 4 Given a set of SV vectors: $v_i$ in space $R^{n_i}$ respectively, i=1, . . . ,k, let $v_i'$ be the morphed vector of $v_i$ from space $R^{n_i}$, respectively, to a "common" space $R^q$. The matrix V formed by all $v_i'$ is called the collection matrix of $v_1$ in space $R^q$, i.e.

$$V = (v_1', \ldots, v_k') = \sqrt{pq} U \quad (5)$$

where U is called the essential collection matrix of $v_i$. Let $u_i$ be the essential SV vectors of $v_i$. Then, $$U=(u_1,\ldots,u_k) \tag{6}$$

Note that the essential collection matrix is independent of the "common" space that the given SV vectors are morphed to, except for setting a common dimensionality. Given a set of SV vectors, the essential collection matrix is different from that which would result from just directly "normalizing" the dimensionalities of these SV vectors to a common space; instead, it is obtained by "normalizing" (if we do want to use the word "normalize") the dimensionalities of the essential SV vectors of these SV vectors to a common space.

Now we are ready to state the algorithm for object recognition using subspace morphing theory developed above. We call this algorithm SM. We first define the general scenario of the problem of object recognition, where we have N classes of objects in the model database, and each class had $N_i$ samples collected (i=1, ... ,N). The idea of SM is to use nearest linear combination in a morphed subspace to find the best match for a query image. Specifically, assume that each sample in the model database is represented by an essential SV vector $u_{ij}$ extracted from the sample image in the database (here i indexes the class number, and j indexes the sample number in this class). Then we use the linear combination $U_i a_i$ of all the essential SV vectors in class i to represent the "cluster region" of this class in the feature space, where Ui is the essential collection matrix of class i, and $a_i$ is a coefficient vector in space $R^{N_1}$. Therefore, given a query image, we can also extract the essential SV vector w. Note that all the sample images in each class may come with different dimensions (i.e., they are not normalized in scale for the reason explained below). Consequently, the SV vectors of these samples are in different dimensionalities, and so is the SV vector for the query image. Based on the subspace morphing theory, we can morph all of their essential SV vectors to an arbitrary "common" space $R^q$, corresponding to an arbitrary hypothetical "common" image in space $R^{p \times q}$. Thus, if the query image is in class i, the following must be true for a specific $a_i$:

$$\sqrt{pq}w=\sqrt{pq}U_i a_i \tag{7}$$

which immediately leads to $$w=U_i a_i \tag{8}$$

Equation 8 is only valid under this "common" morphing subspace $R^q$. Other than this, this constraint is independent of the hypothetical "common" image space $R^{p \times q}$. This is a nice property, which enables us to conduct vector level comparison in different dimensionalities without necessarily worrying about the specific dimensions of the hypothetical "common" space. It should be noted once again that given a set of model SV vectors and a query SV vector, this constraint is different from just directly "normalizing" the dimensionalities of these SV vectors to a common space; instead, it is to "normalize" (if we do want to use the word "normalize") the dimensionalities of the essential SV vectors of these SV vectors to a common space.

Typically, $N_i \ll q$. That means that Equation 8 is overdetermined, and usually it does not hold in equality. Instead, we need to minimize the energy function for each class i:

$$E_i=(w^T-a_i^T U_i^T)(w-U_i a_i) \tag{9}$$

This leads to the constraint of $$\frac{\partial E_i}{\partial a_i} = 0,$$

which results in $$a_i=(U_i^T U_i)^{-1} U_i^T w \tag{10}$$

Hence, we can finally classify the query image as class i if $E_i$ is minimum over the N classes, and it is under a threshold; otherwise, classify it as unknown.

Figure 8:
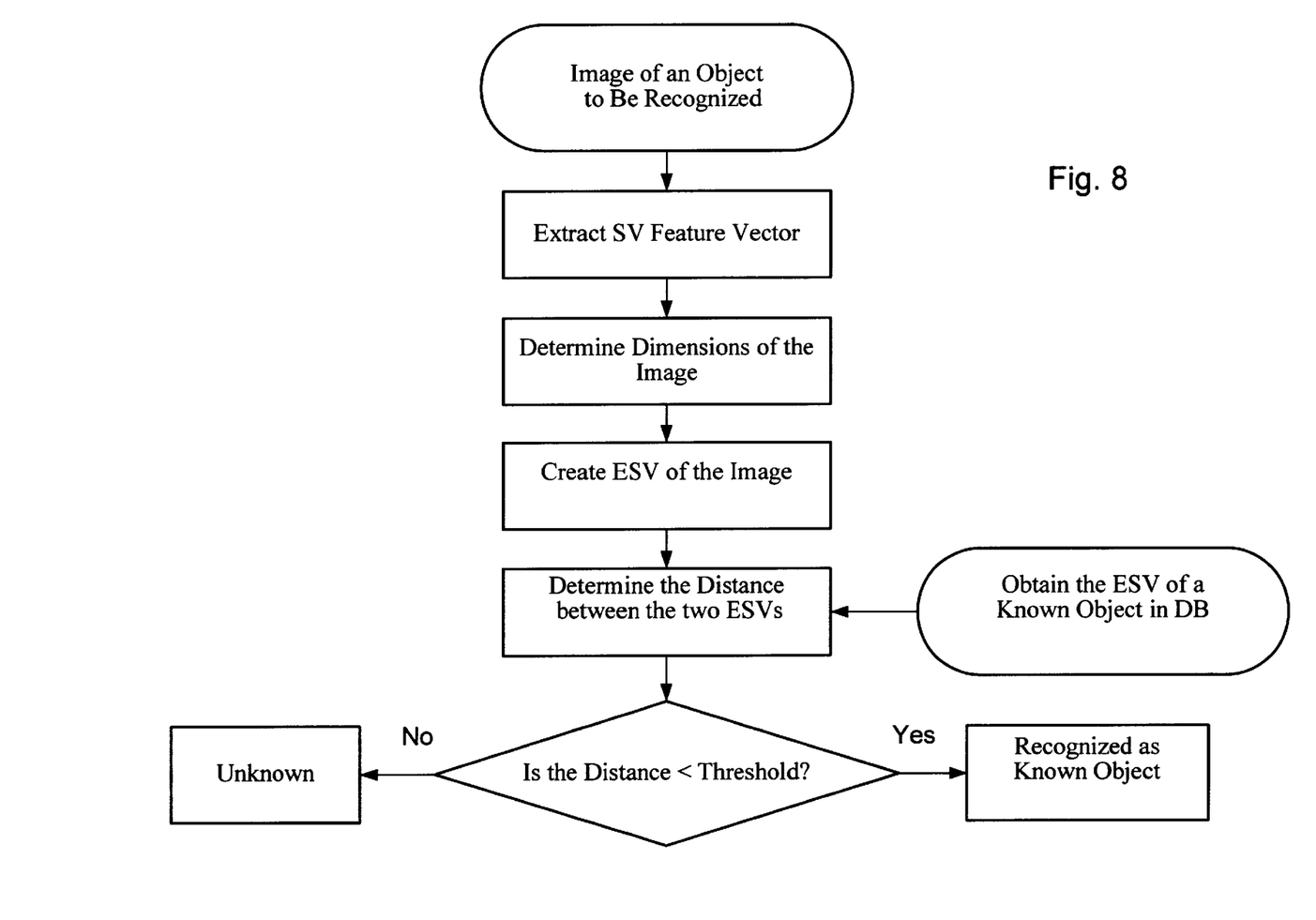
FIG. 8 is a flow chart depicting the steps of the claimed method.

FIG. 8 depicts in graphic form the method described and enabled by the above discussion.

Since using SVD for object recognition is not new, since using nearest linear combination in object recognition is not new, why can't we just normalize all the sample and query images into a standard space and then apply the existing SVD and nearest linear combination techniques for object recognition? Why do we need to bother to do subspace morphing for object recognition? The next section is dedicated to answering these questions.

Why is Normalization to be Avoided?

Object recognition is conducted as searching and matching in a feature space (e.g., eigen features, SVD features, etc.). Since the dimensionality of this feature space is a function of the image dimensions, in order to facilitate the recognition process, all the conventional techniques focus on normalizing images in scale into standard dimensions. While this is feasible and realistic in certain applications (e.g., ID checking where all the photos are in a standard resolution), in many other applications images may be in different dimensions. This situation occurs either in the stage of data collection for constructing a model database, or in the stage of recognition per se, or both. For example, in the intelligence community, face samples are collected from "normal" pictures or video, (as shown in FIGS. 1 and 2), as opposed to mugshot or passport type images with a normalized scale. Therefore, from an application point of view, it is politically necessary to develop techniques that do not rely on a fixed, normalized feature space for object recognition. This was the motivation leading to the development of the subspace morphing theory for object recognition. Below, we show technically why the subspace morphing theory is better than the conventional, normalization-based techniques.

First, normalization requires more computation at the cost of either losing information or introducing redundancy into the normalized feature space. It is clear that conducting normalization in scale requires extra computation (i.e., scale up or down). In addition to this extra computation in the case of scaling up (i.e., transforming from a "smaller" space to a "larger" space), redundancy is introduced, as data interpolation does not bring in new information. Even worse, additional computation is required in feature extraction (e.g., SVD in this context which increases cubically. (The complexity of SVD is $O(mn^2)$ for a matrix in m×n). On the other hand, in the case of scaling down, information which is precious in object recognition has to be lost, although computation is saved in feature extraction. However, this saving is at the cost of losing precious information. In the subspace morphing theory, information is used as is given (i.e., neither is information contained in the original image lost, nor is any redundancy introduced), and no extra cost in additional computation is required.

Second, and more importantly, regardless of what features are used (e.g., either SVD or eigenfeatures), recognition in a fixed, normalized space has less recognition capability in terms of the potential number of object classes to be recognized than the subspace morphing theory has. If the feature space is fixed, say $R^n$, assuming that each class has the same number of samples, say $N_c$, the upper bound of the number of object classes these techniques are able to recognize is $C_{N_c}^n$ (the combinatorial number of choosing $N_c$ from n). In the subspace morphing theory, on the other hand, since the feature space $R^n$ is not fixed, and it can be morphed to an arbitrary space dynamically in the process of matching, this upper bound is determined by the highest dimensions of the images during the recognition process. As the highest dimensions of images are open (i.e., not fixed) in subspace morphing because query images with arbitrary dimensions are expected, this upper bound is also open and in general is much higher than the fixed upper bound, resulting in much larger recognition capability than the conventional recognition techniques.

Third, and most importantly, recognition in a fixed, normalized space tends to have a higher error rate than the subspace morphing theory would have. The difference of the dimensions in images as well as the difference in dimensionalities in the resulting feature space is "extra" and precious information that not only helps enhance the recognition capability as stated above, but also helps reduce the recognition error rate. It is known that normalization may lose information (in the case of scaling down). If the feature space is fixed dimensionally, this amount of lost information may no longer be recovered, nor may it contribute to the recognition. Rather, this information loss contributes to a potential higher recognition error rate. On the other hand, in subspace morphing theory, no information is lost, and every piece of information is used to contribute to the recognition, resulting in a lower recognition error rate.

Thus, it is seen that the subspace morphing theory for object recognition is more attractive, more effective, and more robust than the conventional, normalization-based techniques. This conclusion is also supported experimentally in the next section.

Experimental Results

As mentioned previously, although the subspace morphing theory and the related technique can be applied to any types of object for object recognition, in this patent, we use face recognition as an example to demonstrate the effectiveness and robustness of this technique.

Face recognition has received intensive attention in the community of computer vision and pattern recognition research for quite a long time. Typical methods include eigenfaces and the related subspace analysis, singular value decomposition, Gabor wavelet features, neural networks, and shape and appearance-based probabilistic models. One group of researchers has combined different features together and used the mixture-distance to recognize human faces.

Since color imagery is popular in use and is easy to obtain in practice, we focus our attention only on color imagery in the following implementation and experiments of this technique, although the theory of subspace morphing can be used in intensity imagery as well. The other reason we use color imagery is that certain color features (e.g., hue and chroma as we define here) are incentives with respect to lighting conditions to a certain degree.

We previously explained conceptually why the subspace morphing technique should perform better than the conventional normalization based techniques. This also needs to be demonstrated through experimental evaluations. In order to conduct a fair comparison through experiments, it would be ideal that we could have a common testbed (i.e., a model face database, and a test face database) to test both the subspace morphing based technique and the conventional normalization based techniques. Unfortunately, all the publicly available face databases are made as normalized samples. In fact, the conventional normalization based techniques could be viewed as a trivial special case of the subspace morphing theory, in which no subspace morphing is conducted. If we used any of these face databases, that would make the essential strength of this technique impotent, and would essentially make this technique reduced to the conventional normalization based techniques.

Based on this consideration, we conducted a "self evaluation", meaning that we collected a model face database and a test face database, and use this technique to measure the recognition rate. We collected a model face database of 112 face sample images of 25 individuals, and a test face database of 226 face sample images of these 25 individuals. Part of these face images were collected by directly using a digital camera to take the face images of the individuals. The rest of the images in these databases were collected by running a face detection system to a collection of daily-life or business images such as FIG. 1 contributed voluntarily by people, or obtained via the internet, and cropping the face samples in these pictures automatically. During the process of data collection, we paid special attention to collecting data reflecting significant variations in scale, pose, orientation, expression, contrast, and background. For all the face images collected in both databases, we leave the images "as the way they were", i.e., no normalization in scale was performed.

The distribution of the number of images for each individual in the databases is not uniform, depending on the availability of the individuals. For those individuals whose face samples were obtained through personal contribution or through internet collection, the number of samples was very limited. On the other hand, for those individuals who were willing to let us take their face samples directly using a digital camera, we were able to collect relatively large number of samples with significantly large variations in appearances. Nevertheless, we tried to keep a relatively balanced distribution in the model face database; individuals in this database receive number of samples varied from three to seven, with most of the individuals having four or five samples.

Figure 4:
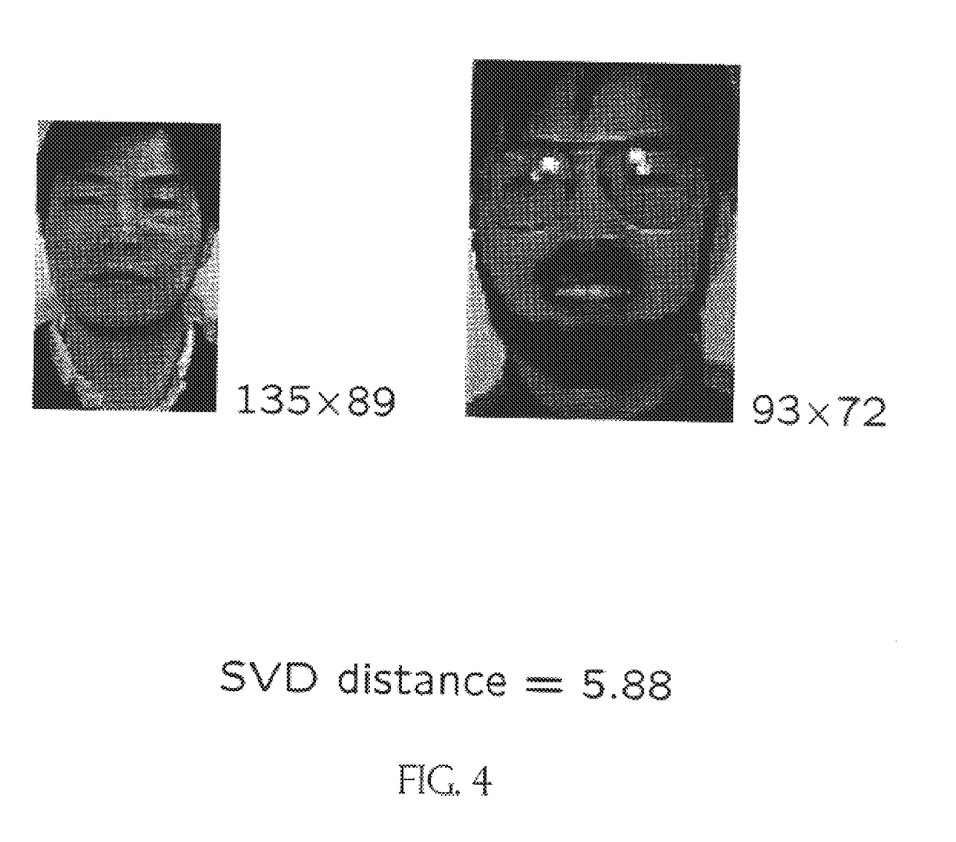
FIG. 4 illustrates the SVD Distance of a pair of SV morphed vectors for two face images of the same individual, where the individual images have different scales, orientations, poses and expressions.
Figure 5:
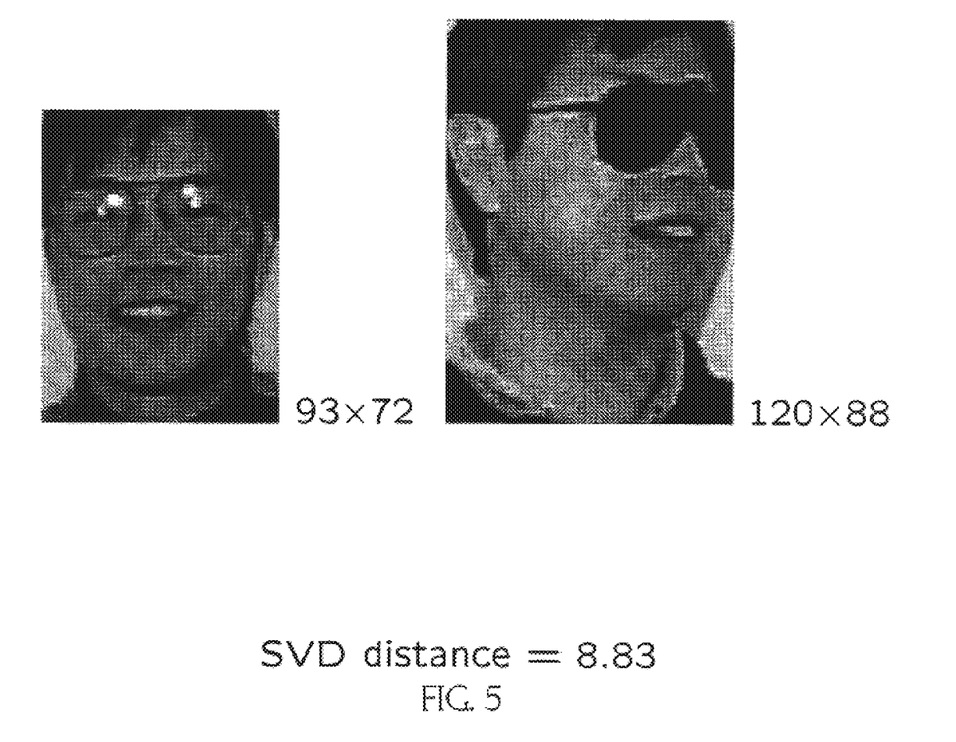
FIG. 5 illustrates the SVD Distance of a pair of SV morphed vectors for two face images of the same individual, where the individual images have different scales, orientations, poses and expressions.
Figure 6:
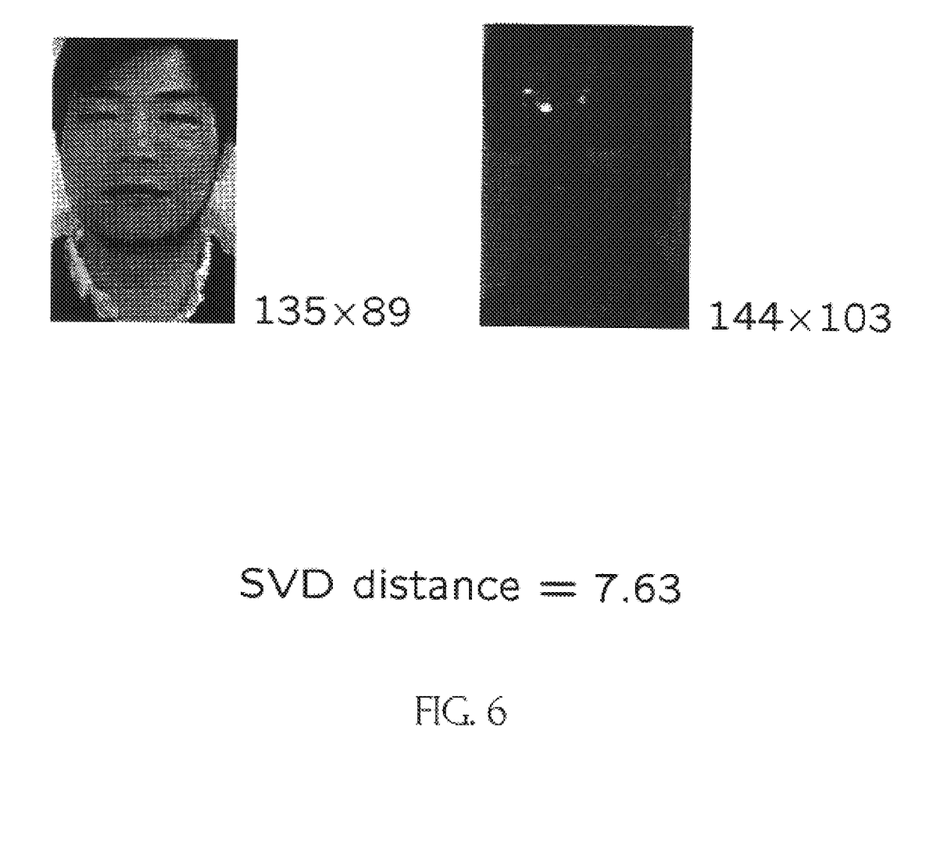
FIG. 6 illustrates the SVD Distance of a pair of SV morphed vectors for two face images of the same individual, where the individual images have different scales, orientations, poses and expressions.
Figure 7:
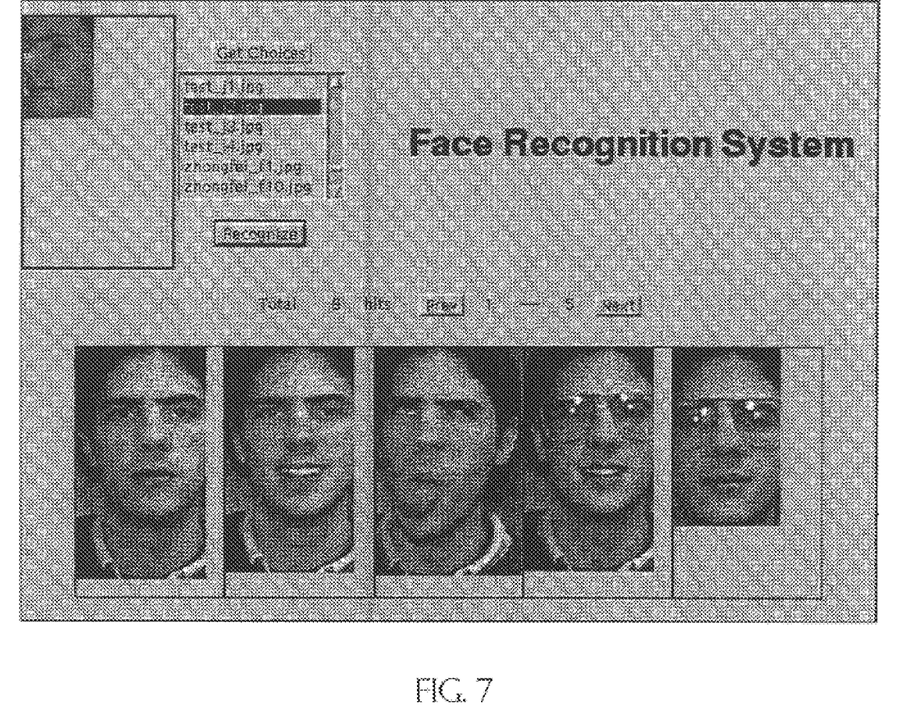
FIG. 7 is a screen capture taken from the computer-based system of the invention, which screen capture illustrates performance of the system.

With this model face database, we ran the SM algorithm over every face images in the test face database. Of the 226 test samples, only 18 were misclassified! That means that based on this set of evaluation, the recognition rate is about 92%. FIG. 7 is a screen capture taken from the computer system of the present invention, which shows a test image being matched by five images from the database (the system actually found six matches, but only five are shown in the screen capture). The image in the upper-left corner is the query image, and the five images shown in the bottom of the screen are the images in the database corresponding to this individual. We examined the 18 misclassification cases, and found that all of them were probably due to the biased distribution of appearance in the variation space for the sample images in the model face database. In fact, almost all the sample images in the model database were frontal or near frontal face images and were taken at the same time for each individual (i.e., the same background, e.g., hairstyle, cloths, etc.). This can be seen in FIGS. 4 to 6, which illustrate examples of recognition of the same individuals with different scales, orientations, poses and expressions. Note the significant change in appearances, scales, lighting conditions, and contrasts between the samples in the model database and the samples in the test database. Research shows that human eyes play a significant role in face recognition for human vision. Yet in one of the test images, the individual wore sunglasses to block the eyes, but this sample was still correctly recognized.

Thus, it is seen that we have developed a new computer-based method and apparatus for appearance based object recognition, based upon a new theory using subspace morphing. The robustness and effectiveness of this theory is demonstrated through face recognition experiments with a 92% recognition rate in a very complicated test database. Although this technique still needs to be evaluated in a larger scale experiment, it is not difficult to see the robustness already present through this experiment.

What we claim is:

1. A method for recognizing an image of an object, comprising:
    a) extracting a singular value (SV) feature vector from said image of an object;
    b) determining dimensions of said image of said object;
    c) creating a first essential singular value vector (ESV) based upon said extracted singular value (SV) feature vector and said dimensions of said image of said object;
    d) comparing said first ESV vector of said image of an object to be recognized with a second ESV vector stored in a database, where said second ESV vector is representative of a known object to determine a distance between said first ESV vector and said second ESV vector; and,
    e) determining if said distance is within a predetermined range, which would indicate that said object to be recognized is the same as said known object represented by said second ESV vector.

2. A method for recognizing an image of an object as recited in claim 1 where said object is a face.

3. A method for recognizing an image of an object as recited in claim 1 wherein said predetermined range is determined empirically.

4. A method for recognizing an image of an object, comprising:
    a) extracting a singular value (SV) feature vector from said image of an object;
    b) determining dimensions of said image of said object;
    c) creating a first essential singular value vector (ESV) based upon said extracted singular value (SV) feature vector and said dimensions of said image of said object;
    d) comparing said first ESV vector of said image of said object to be recognized with a second ESV vector stored in a database, where said second ESV vector is representative of a first known object to determine a first distance between said first ESV vector and said second ESV vector;
    e) comparing said first ESV vector of said image of said object to be recognized with a third ESV vector stored in a database, where said third ESV vector is representative of a second known object to determine a second distance between said first ESV vector and said third ESV vector; and,
    f) comparing said first and second distances to determine which of said first and second distances is lower where said lower distance indicates which of said second and third ESV vectors is more likely to represent the object to be recognized.

5. A method for recognizing an image of an object as recited in claim 4 wherein said database comprises two or more ESV vectors.

6. A method for recognizing an image of an object as recited in claim 5 wherein said database comprises feature vectors which represent at least one class of objects.

7. A method for recognizing an image of an object as recited in claim 5 wherein said database comprises feature vectors which represent two or more classes of objects.

8. A method for recognizing an image of an object as recited in claim 4 where said object is a face.

9. A method for recognizing an image of an object as recited in claim 4, further comprising the step of determining if said lower distance is within a predetermined range, in which case the ESV vector corresponding to said lower distance is most likely representative of the object to be recognized.

10. A method for recognizing an image of an object, comprising:
    a) extracting a singular value (SV) feature vector from said image of an object;
    b) determining dimensions of said image of said object;
    c) creating a first essential singular value vector (ESV) based upon said extracted singular value (SV) feature vector and said dimensions of said image of said object;
    d) comparing said first ESV vector of said image of said object to be recognized with a plurality of ESV vectors stored in a database, where each of said stored ESV vectors is representative of a known object to determine a distance between said first ESV vector and each of said plurality of ESV vectors; and,
    e) selecting an ESV vector from said plurality of ESV vectors having the lowest distance to said first ESV vector, where the ESV vector corresponding to said lowest distance is likely to represent the object to be recognized.

11. A method for recognizing an image of an object as recited in claim 10, further comprising the step of determining if said lower distance is within a predetermined range, in which case the ESV vector corresponding to said lower distance is most likely representative of the object to be recognized.

12. A method for recognizing an image of an object as recited in claim 10 where said object is a face.

13. A method of identifying an object within an image containing two or more objects, comprising:
    a) detecting one or more candidate class(es) of objects within said image based upon a segmentation of said image;
    b) selecting a specific candidate class of objects to be recognized based upon a user specification;
    c) recognizing a sub-image of an object within said specific candidate class of objects, where said recognizing is accomplished by steps comprising the following:
        1) extracting a singular value (SV) feature vector from said sub-image of said object to be recognized;
        2) determining dimensions of said sub-image of said object to be recognized;
        3) creating a first essential singular value vector (ESV) based upon said extracted SV feature vector and said dimensions of said sub-image of said object to be recognized;
        4) comparing said first ESV vector of said sub-image of said object to be recognized with a second ESV vector stored in a database, where said second ESV vector is representative of a known object to determine a distance between said first ESV vector and said second ESV vector; and, 5) determining if said distance is within a predetermined range, which would indicate that said object to be recognized is identified as said known object represented by said second ESV vector.

14. A method of identifying an object within an image containing two or more objects, as recited in claim 13, wherein said segmentation is selected from the group consisting of color features, shape features and texture features of said objects.

15. A method of identifying an object within an image containing two or more objects, as recited in claim 13, wherein said segmentation comprises color features of said objects.

16. A method of identifying an object within an image containing two or more objects, as recited in claim 15, wherein said color segmentation comprises consideration of hue characteristics of said objects.

17. A method of identifying an object within an image containing two or more objects, as recited in claim 15, wherein said segmentation comprises consideration of chroma characteristics of said objects.

18. A method of identifying an object within an image containing two or more objects, as recited in claim 13, wherein said object to be identified is a face.

19. A method of organizing a first database containing representations of one or more images, where each image is associated with an object, comprising:

a) extracting a singular value (SV) feature vector from each of said one or more images;

b) determining dimensions of each of said one or more images;

c) creating an essential singular value vector (ESV) based upon said extracted singular value (SV) feature vector and said dimensions of each of said one or more images; and, d) calculating an essential collection matrix from said ESV of each of said one or more images, where said essential collection matrix represents an image of an identical object.

20. A method of organizing a database as recited in claim 19, further comprising the step of storing said essential collection matrix in said first database.

21. A method of organizing a database as recited in claim 19, further comprising the step of storing said essential collection matrix in a second database.

22. A method of organizing a database as recited in claim 19, further comprising the step of recognizing an unknown object by comparing an extracted essential singular value vector (ESV) from an image of said object with each of said essential collection matrices stored in said database.

23. A method of organizing a database as recited in claim 22 wherein said recognizing said unknown object by comparing an extracted essential singular value vector (ESV) further comprises the step of determining the smallest distance between said ESV of said image of said object and each of said essential collection matrices of said database, where the matrix corresponding to said smallest distance represents the unknown object.

* * * * *